United States Patent
Guler et al.

(10) Patent No.: US 7,536,338 B2
(45) Date of Patent: *May 19, 2009

(54) METHOD AND SYSTEM FOR AUTOMATED BID ADVICE FOR AUCTIONS

(75) Inventors: Kemal Guler, Cupertino, CA (US); Tongwei Liu, Brooklyn, NY (US); Hsiu-Khuern Tang, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1679 days.

This patent is subject to a terminal disclaimer.

(21) Appl. No.: 09/955,264

(22) Filed: Sep. 10, 2001

(65) Prior Publication Data

US 2003/0093357 A1 May 15, 2003

(51) Int. Cl.
*G06Q 40/00* (2006.01)
(52) U.S. Cl. ...................................... 705/37
(58) Field of Classification Search ........... 705/26, 705/36, 37; 703/2
See application file for complete search history.

(56) References Cited

U.S. PATENT DOCUMENTS

| | | | | |
|---|---|---|---|---|
| 5,101,353 A * | 3/1992 | Lupien et al. | ........... | 705/37 |
| 6,021,398 A * | 2/2000 | Ausubel | ........... | 705/37 |
| 6,131,087 A * | 10/2000 | Luke et al. | ........... | 705/26 |
| 6,161,099 A * | 12/2000 | Harrington et al. | ........ | 705/36 R |
| 6,285,989 B1 * | 9/2001 | Shoham | ........... | 705/37 |
| 6,366,891 B1 * | 4/2002 | Feinberg | ........... | 705/37 |
| 6,415,270 B1 * | 7/2002 | Rackson et al. | ........ | 705/36 R |
| 6,556,960 B1 * | 4/2003 | Bishop et al. | ........... | 703/2 |
| 6,629,082 B1 * | 9/2003 | Hambrecht et al. | ........ | 705/36 R |
| 6,871,190 B1 * | 3/2005 | Seymour et al. | ........... | 705/37 |
| 7,096,197 B2 * | 8/2006 | Messmer et al. | ........... | 705/37 |
| 2002/0042769 A1 * | 4/2002 | Gujral et al. | ........... | 705/37 |

OTHER PUBLICATIONS

Zellner, Arnold: Estimation of regression relationships containing unobservable independent variables, International Economic Review vol. 11, No. 3, Oct. 1970, pp. 441-454.*
Castillo et al.: Estimating Transition—Probabilities in a dynamic graphic model with unobservable variables, Jun. 2001, IEEE Transactions on Reliability, vol. 50, No. 2, pp. 135-144.*

* cited by examiner

*Primary Examiner*—Hani Kazimi
*Assistant Examiner*—Bijendra K Shrestha

(57) ABSTRACT

The present invention provides an automated estimation and optimization solution for selecting the optimal bid for an item in an auction. The characteristics of the auction are selected (e.g., auction format, reserve price). A relevant bidding model, based on the characteristics of the auction, is selected. The structure of the auction is estimated based on the relevant bidding model. A bid function is determined based on the auction structure and user inputs regarding the item being bid on and the characteristics of the rival bidders. An optimal bid is determined based on the bid function and user-defined evaluation criterion. An embodiment of the present invention provides a method and system that determines the latent elements of the auction environment taking into account the strategic and information conditions with minimal assumptions on the distributions of unobserved random elements. The present invention allows a bidder to estimate the unobservable private signals of rival bidders and to determine the optimal bid the bidder can employ to optimize their evaluation criterion.

18 Claims, 15 Drawing Sheets

Historical Auction Data Repository contains data on past auctions. For the purposes of present invention, the following variables are observed for each auction in the database.

Auction:
    Auction ID
    Further Auction Characteristics
Auctioned Item:
    Item ID
    Name
    Quantity
    Description
    Further Item Characteristics
Mechanism:
    Auction Format
    Reserve Price
    Further Mechanism Characteristics
Bidders:
    Bidder ID
    Segment ID
    Further Bidder Characteristics
Bids
    Identities of participating bidders
    Bids submitted by participating bidders
Outcomes:
    Assigned payments for each bidder
    Assigned quantities for each bidder

Figure 9a

AUCTION CHARACTERISTICS:
    Auction ID
    Item ID
    Item Name
    Quantity
    Dates:
        Announcement
        Start
        Close
    Seller/Buyer ID
    Auction Mechanism Characteristics
    Invited Bidders' IDs
    Participating Bidders' IDs and Bids, Quantities
    Outcome:
        Assigned Price for each bidder
        Assigned Quantities for each bidder
    Fees:
        Shipping & Handling
        Taxes
        Auctioneer Fees:
            Posting Fee
            Ad Valorem Fee

Figure 9b

BIDS:
- Bid ID
- Auction ID
- Item ID
- Bidder ID
- Bid Time Stamp
- Price Bid
- Bid Type
  - Proxy
  - Direct
- Quantity Desired
- Minimum Quantity
- Currency

Figure 9c

MECHANISM CHARACTERISTICS:
- Format
  - English
  - Dutch
  - Sealed Bid First Price
  - Sealed Bid Second Price
  - Vickrey
  - etc
- Buy/Sell
- Entry Rule
  - Open
    - Free
    - Fee
  - Invitation
    - Free
    - Fee
- Reserve Price
  - Secret
  - Open
- Start Price
- Bid Increment
  - Fixed
  - Relative
- Closing Rule
  - Inactivity Time
  - Fixed Closing Time

Figure 9d

ITEM CHARACTERISTICS:
- Item ID
- Name
- Description
- Location
- SKU
- Manufacturer
- Model Number
- Condition
- Warranty
- Weight
- Weight Unit
- Measurement Unit
- Currency
- List Price
- etc

Figure 9e

BIDDER CHARACTERISTICS:
    ID
    Segment ID
    Name
    Address
    General Information
    Socio Demographic Information
    Etc

Figure 9f

SELLER/BUYER CHARACTERISTICS:
    Seller/Buyer ID
    Name
    Address
    General Information
    Socio Demographic Information
    Etc

Figure 9g

METHOD AND SYSTEM FOR AUTOMATED BID ADVICE FOR AUCTIONS

FIELD OF INVENTION

The present invention relates to the field of auction design and analysis processes. Specifically, the present invention relates to a method and system for automated bid advice for bidder in an auction.

BACKGROUND OF THE INVENTION

A bidder participating in an auction has to make a number of decisions. Primarily, he/she must evaluate the value of the item(s) being sold (or bought in the instance of a procurement auction) based on the information he/she possesses. Some of this information may be bids of rivals that are revealed during the course of the auction. Second, he/she needs a procedure to assess the probability of winning as a function of alternative bids he may submit in the auction. The best actions typically depend on the rules of the auction (e.g., auction format and reserve price) and on the specifics of the competitive situation characterized typically by the rival bidders' attitudes towards risk, the distribution of bidders' private information and other relevant random elements.

A bidder at an auction, whether buying or selling, can improve his expected payoff by submitting a bid that takes into consideration various factors including the auction format, the reserve price, the number of rival bidders and their value distributions and risk attitudes.

As is known, the outcome of an auction (e.g., who gets what, who pays how much) is determined by bidding behavior of bidders. Bidding behavior depends on a number of factors including the auction rules. Different auction rules induce different behavior on the part of the bidders. A bidder's behavior under a given collection of auction rules in turn is determined by the bidder's private information. The structure of the private information held by the bidders is thus a key factor in evaluating alternative auction rules. This fundamental element of the auction environment is not directly observable and has to be estimated from available data.

Currently, the decisions on bidding are left entirely to the person bidding on the auctioned item(s). There is little systematic data analysis to guide these decisions. Given the multiplicity of items bought/sold through auctions, it is typically too costly to hire expert analysts to determine bids for each case. Furthermore, a fixed method for determining a bid is rarely optimal for every case to which it is applied. Bidders typically must resort to decisions based on personal feelings and instinct, and even when the bidder has reliable information about various aspects of the auction and his rivals, he usually does not know how to use that information to arrive at a bid amount.

Currently, there is not an integrated data collection, modeling, estimation and optimization solution for selecting the bid optimally based on structural econometric analysis of available data. All decisions must be based on personal knowledge rather than a systematic analysis. As a result, a determination of an optimal bid is often guesswork and may not provide optimal results.

Accordingly, there exists a need for an automated estimation and optimization solution for selecting the best bid in an auction. A need exists for a method and/or system that provides automated decision support for selecting the best bid based on structural analysis of data from related auctions. A need also exists for a method and/or system that accomplishes the above needs and provides a method and/or a system for estimating the likely outcomes under alternative bidding strategies and to identify the best bidding strategy for a multiplicity of auction rules and competitive environments.

SUMMARY OF THE INVENTION

The present invention provides a method and a system for providing an automated estimation and optimization solution for selecting the best bid in an auction. The present invention also provides a method and system that provides automated decision support for selecting the best bid based on structural analysis of data from related auctions. The present invention also provides a method and system for estimating the likely outcomes under alternative bidding strategies and to identify the best bidding strategy for a multiplicity of auction rules and competitive environments.

A bidder participating in an auction to buy (or sell in a procurement auction) an item(s) can improve the auction outcome in his/her favor by making decisions based on a systematic analysis of the competition he/she is facing. Rival bidders' characteristics (risk attitudes, valuation distributions) can be estimated by using structural econometric analysis of bids in past auctions, and the estimated rival bidder characteristics can be combined with other available information to evaluate alternative bidding strategies and to select the best one among them.

The present invention provides an automated estimation and optimization solution for selecting the optimal bid for an item in an auction.

The characteristics of the auction are selected (e.g., auction format, reserve price). A relevant bidding model, based on the characteristics of the auction, is selected. The structure of the auction is estimated based on the relevant bidding model. A bid function is determined based on the auction structure and user inputs regarding the item being bid on and the characteristics of the rival bidders. An optimal bid is determined based on the bid function and user-defined evaluation criterion.

An embodiment of the present invention provides a method and system that determines the latent elements of the auction environment taking into account the strategic and information conditions with minimal assumptions on the distributions of unobserved random elements. The present invention allows a bidder to estimate the unobservable private signals of rival bidders and to determine the optimal bid the bidder can employ to optimize their evaluation criterion.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention:

FIGS. 9a-g depict the contents of an exemplary database of market data, in accordance with one embodiment of the invention.

DETAILED DESCRIPTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed by computer systems. These descriptions and representations are used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical, electronic, magnetic, optical, and/or electro-optical signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" or "calculating" or "estimating" or "evaluating" or "inputting" or "outputting" or "predicting" or "receiving" or "retrieving" or "selecting" or the like, refer to the action and processes of a computer system, or similar electronic computing device, that manipulates and transforms data represented as physical (electronic) quantities within the communications and computer systems' registers and memories into other data similarly represented as physical quantities within the computer system memories or registers or other such information storage, transmission, or display devices.

Figure 3:
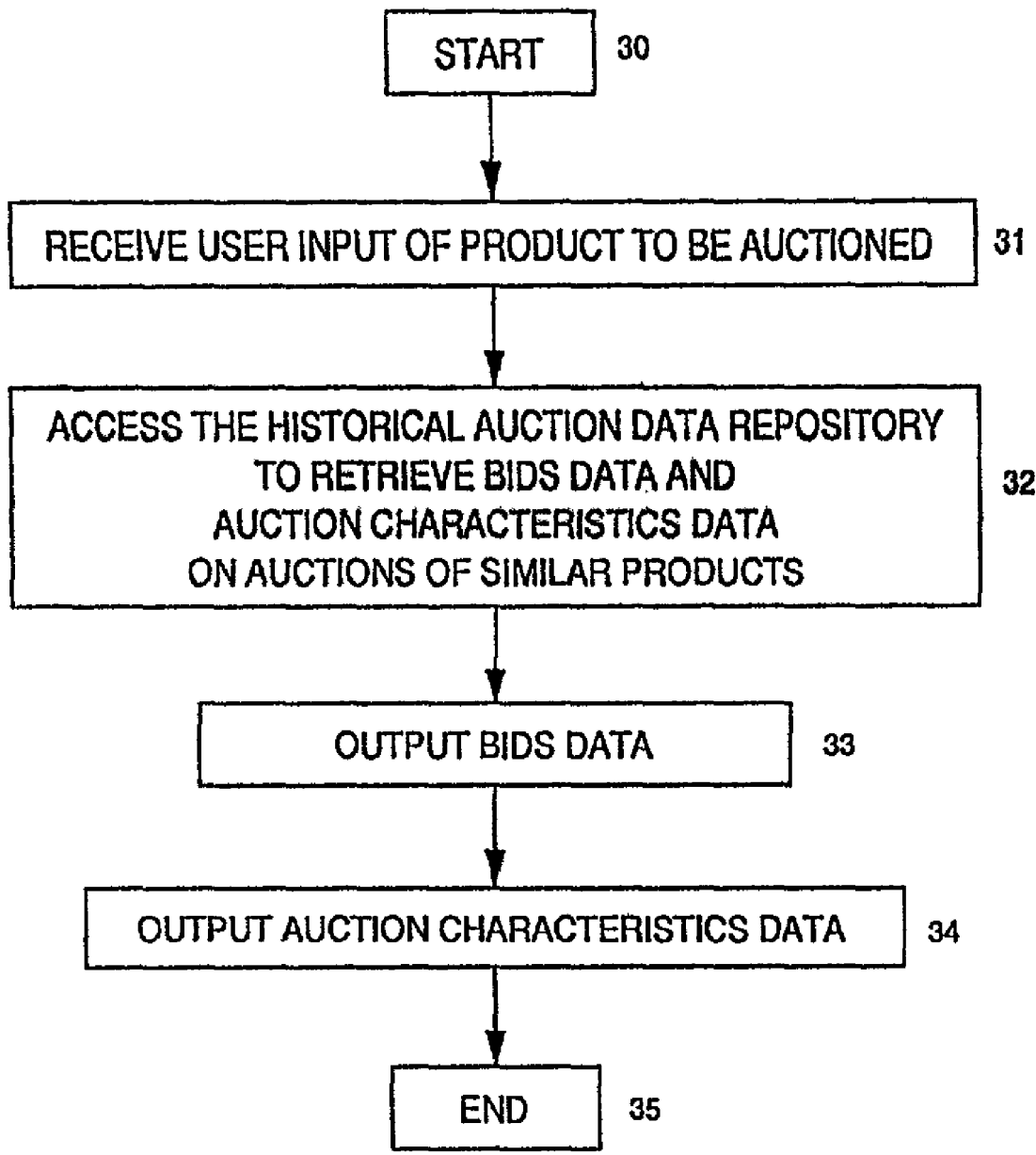
FIG. 3 is a flow chart of the steps in a process for generating market characteristics data, in accordance with one embodiment of the invention.

Certain portions of the detailed descriptions of the invention, which follow, are presented in terms of processes (e.g., process 30 of FIG. 3). These processes are, in one embodiment, carried out by processors and electrical and electronic components under the control of computer readable and computer executable instructions. The computer readable and computer executable instructions reside, for example, in registers and other features of processors, memories, and data storage features of computers executing programs and processes. However, the computer readable and computer executable instructions may reside in any type of computer readable medium. Although specific steps are disclosed in figures herein describing the operations of processes (e.g., FIG. 3 describing process 30), such steps are exemplary. That is, the present invention is well suited to performing various other steps or variations of the steps recited in the flowcharts of the figures herein. Further, it is appreciated that the steps of these processes may be performed by software or hardware or any combination of software and hardware.

The present invention is discussed primarily in the context of a method for determining an optimal bid for a market structure, such as an auction, with respect to a multiplicity of possible market participants, such as bidders. In the following discussion, a market analysis system, especially applicable to auctions, will first be discussed in a general context, after which, specific explanations will be made to applying the system to selecting optimal auction bids.

Exemplary System

Exemplary Automated Decision Support System in General

Figure 1:
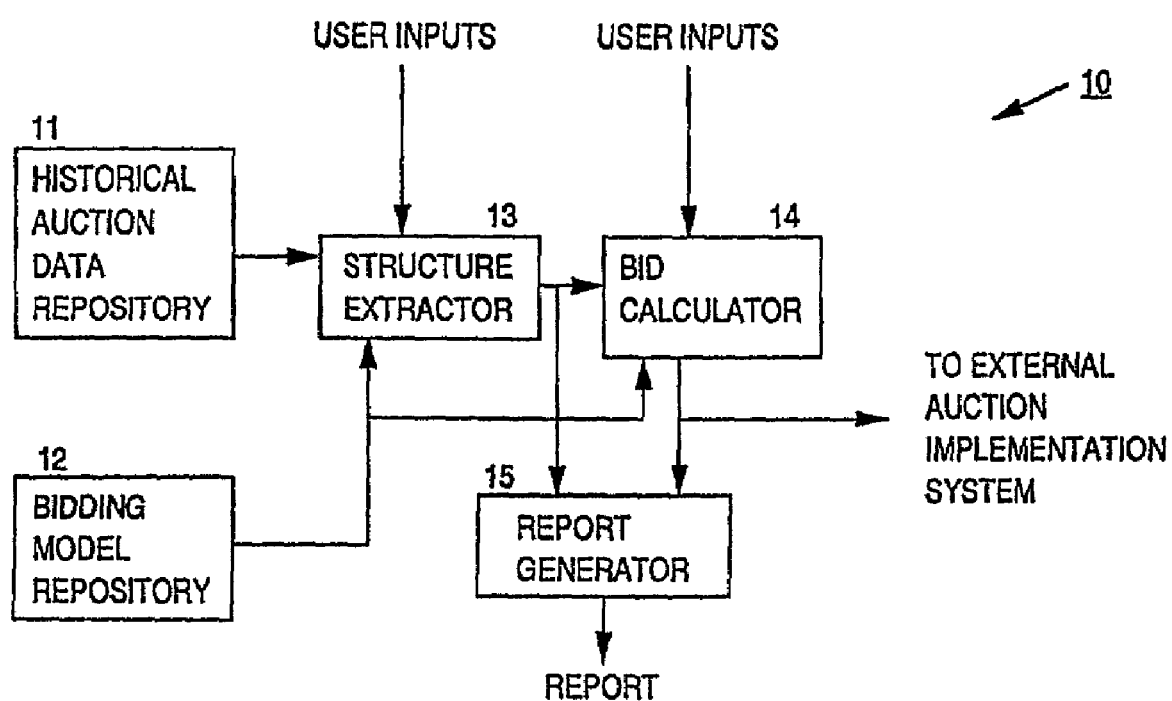
FIG. 1 schematically shows an automated decision support system for designing auctions, in accordance with one embodiment of the invention.

FIG. 1 shows an automated decision support system 10 for determining an optimal bid in an auction in accordance with one embodiment of the present invention. In one embodiment, the automated decision support system 10 is a software system implemented in a computer system. Alternatively, the automated decision support system 10 can be implemented by hardware or firmware.

The computer system that embodies the automated decision support system 10 can be any kind of computer system. For example, the computer system can be a main-frame computer system, a super computer system, a workstation computer system, a server computer system, or a personal computer system. In one embodiment, the computer system is computer system 800 of FIG. 8, as described below.

The automatic decision support system 10 is used to provide automated decision support for auction bids, aiding auction bidders in making auction-related decisions. As described above, there are typically a number decisions to be made by a bidder regarding an auction. For example, in an auction a bidder has to decide on (1) how to bid and (2) whether or not to bid in a specific auction conditional on information the bidder has. In addition, the bidder needs to decide whether or not and how to gather information on auctions, objects and rivals. As is known, these decisions affect the final payoff of the auctioned item(s).

In order to achieve the bid amount to maximize the final payoff, these decisions must be optimized. In accordance with one embodiment of the present invention, this optimization is done by the automatic decision support system 10. The automatic decision support system 10 provides optimal configuration of auction design parameters and comparative evaluation of any pair of design choices. In other words, the automatic decision support system 10 provides automated auction analysis optimization.

In accordance with one embodiment of the present invention, the automatic decision support system 10 processes available data using structural econometric techniques to identify the latent distribution of random or unknown elements of the market structure or market environment of a particular auction. In addition, the automatic decision support system 10 provides the optimal values of the bid amount based on an evaluation criterion specified by the user of the system 10 conditional on the levels of the remaining decisions.

The available data to the automatic decision support system 10 include data supplied by the user of the system 10. The data include a set of auctions the bidder is interested in, initial valuations for each item, relevant constraints, and auction evaluation criterion. For each auction the bidder is interested in, the bidder provides a description of each item, a description of the rules of the auction (e.g., auction format and reserve price), and any information concerning the number and characteristics of rival bidders. These are user inputs to the automatic decision support system 10. The available data also include historical auction data and bidding model data. The historical auction data and the bidding model data are stored in the automatic decision support system 10.

The automatic decision support system 10 receives the user inputs of the set of auctions the bidder is interested in, initial valuations for each item, relevant constraints, and auction evaluation criterion. The automatic decision support system 10 then selects the best bidding strategy (e.g., the optimal initial bid) for each of the inputted auction the bidder is interested in based on the auction evaluation criterion and the estimated market structure of the auction.

As is known, bidding behavior determines the outcome of an auction. The outcome of an auction means who gets what and who pays how much, etc. Different auction rules induce different bidding behavior on the part of bidders. A bidder's behavior under a given set of auction rules in turn is determined by his private information. The structure of private information held by bidders is thus a key factor in evaluating alternative auction procedures (e.g., auction format, reserve prices, entry fees, timing and duration of the auction, quantity, participation rules, and information rules, etc.) from the point of view of a seller (or buyer) trying to sell (or procure) an item by auctioning. This fundamental element of an auction environment is not directly observable and has to be estimated from observable and available data. The auction procedures can also be referred to as auction mechanisms. They include the characteristics of the auction.

In accordance with one embodiment of the present invention, the automatic decision support system 10 estimates the unknown or unobservable elements of the market structure of the auction by extracting the joint distribution of private information of the bidders (e.g., the probability distribution of bidders' willingness to pay, the probability distribution of the number of potential bidders) from bid data extracted from the historical auction data of similar auctions. In particular, the automatic decision support system 10 estimates the unknown elements of the market structure by (1) expressing unobservable variables in the bidding model in terms of the observable bid data, and (2) applying known statistical density estimation techniques to the expression so as to obtain an estimation of the unknown elements. In doing so, the automatic decision support system 10 enables the user (e.g., the bidder) of the system 10 to factor the distribution of bidders' private information into his or her decisions regarding the appropriate bidding strategy to conduct the auction.

With the estimated unknown elements of the market structure and other user inputs (e.g., the valuation of items bidder is interested in, evaluation criterion), the automatic decision support system 10 provides optimized bidding strategies based on the evaluation criterion provided such that optimal payoff can be achieved. The automatic decision support system 10 can be used to configure optimized bidder decisions for a multiplicity of performance criteria. The structure and operation of the automatic decision support system 10 will be described in more detail below, also in conjunction with FIGS. 1 through 7.

As can be seen from FIG. 1, the automatic decision support system 10 includes a historical auction data repository 11, a bidding model repository 12, a structure extractor 13, a bid calculator 14, and report generator 15. The historical auction data repository 11 stores the historical auction data for previous auctions. The historical auction data specify auction characteristics and/or mechanisms of previous auctions. This means that the historical auction data include the bid data and the auction characteristics data of each of the stored previous auctions. The auction characteristics data specify the auction procedure of the auction. Thus, the auction characteristics data of an auction describe the reserve price of the auctioned item, the auction format, the number of bidders, etc. of the particular auction. The bid data of an auction describe the bidding behaviors of bidders in the auction. The bid data is a record that typically contains the auction identifier, number of bidders N, number of bids, transaction price, winner, reserve price, auction format, item characteristics, bidder characteristics. Both the bid data and the auction characteristics data are extracted from the auction data of the previous or historical auctions for various items. The historical auction data repository 11 can be implemented using any known database technology.

The bidding model repository 12 stores various bidding models. A bidding model specifies a bidding behavior pattern. It is a function of auction characteristics or procedure of the corresponding auction. It is also a function of the market structure of the auction. For example, a Dutch auction bidding model specifies bidding behavior in a Dutch format auction. An English auction bidding model specifies bidding behavior in an English format auction. A first-price-sealed-bid auction bidding model specifies bidding behavior in a first-price-sealed-bid auction. The bidding model repository 12 can be implemented using any known database technology. Several examples of bidding models are provided in detail below.

The structure extractor 13 is used to estimate the unknown elements of the market structure of the auction. The structure extractor 13 first receives the user input of the item (and its characteristics) to be auctioned. The structure extractor 13 then accesses the repository 11 for the bid data and auction characteristics data observed in previous or historical auctions of similar items of the item. The structure extractor 13 is connected to the historical auction data repository 11 and the bidding model repository 12. The structure extractor 13 then produces a non-parametric structural estimate of the unobservable latent structure of the environment of the auction. The structure extractor 13 uses auction theory and non-parametric statistical methods to extract an estimate of the latent structure from the previously observed bids.

Exemplary System Applied to Selecting an Optimal Bid in an Auction

A bidder participating in an auction to buy (or sell in a procurement auction) an item(s) can improve the auction outcome in his/her favor by making decisions based on a systematic analysis of the competition he/she is facing. Rival bidders' characteristics (risk attitudes, valuation distributions) can be estimated by using structural econometric analysis of bids in past auctions, and the estimated rival bidder characteristics can be combined with other available information to evaluate alternative bidding strategies and to select the best one among them.

The present invention provides a process for extracting relevant information about an auction, and using this information to arrive at a bid amount that optimizes a user-specified evaluation criterion, for example, the expected payoff. The process involves getting data from past auctions of similar items and getting the user's input on any relevant information like the auction format and the number of rivals. It also involves statistical estimation of the unknown structural elements like the probability distributions of the bidders' values and the utility function of the bidders. The utility function is a mathematical construct used to measure a person's risk attitude; it maps a wealth level into a utility of that wealth.

With reference still to FIG. 1, automated decision support system 10 effectuates determining an optimal bidding strategy in accordance with one embodiment of the present invention. In one embodiment of the present invention, the automated decision support system 10 analyzes available data using structural econometric techniques, as discussed above, to estimate the unknown distribution of private information held by bidders. In addition, the system of the present embodiment provides the optimal values of the decision variables based on an evaluation criterion specified by the user of the system. System 10, as effectuated by the present embodiment, has three major functional components in determining an optimal bid in an auction. The first is structural modeling and estimation module 13. The second is a bid calculator module 14, and the third is a report generation module 15. In an alternative embodiment, another combination of components with functions duplicative of the forgoing may effectuate this functionality.

Structural Modeling and Estimation

In one embodiment, the first functionally active component of the automated decision support system 10 (FIG. 1), structure extractor 13, effectuates the estimation of the distributions of private signals of bidders from bid data in prior auctions and allows for possible asymmetries across identifiable bidder groups to be recognized.

Bidding Strategy Selection

Referring still to FIG. 1, bid calculator module 14 selects the best bidding strategy for each auction under consideration. Bidding strategy selection is performed for a wide variety of user specified evaluation criteria. This collection of criteria includes, but is not limited to the expected payoff, and the ratio of expected payoff to the standard deviation of the payoff. The end-user (bidder) inputs a specific performance criterion to be optimized by possibly combining these elements.

Report Generation

Again referring to FIG. 1, the expected performance level associated with alternative bids and the best bid as well as expected variation in the performance level are reported by a report generator 15.

System 10 maintains, in one embodiment, two data repositories. As depicted in FIG. 1, these include a repository 11 of historical auction data for a multiplicity of goods and services, and a repository 12 of bidding models for a multiplicity of auction mechanisms and a multiplicity of market environments. For selecting an optimal bid, in the present embodiment, system 10 uses data from both historical auction data repository 11 and bidding model repository 12 as inputs.

Historical auction data repository 11 contains data on past auctions. Historical auction data repository can be implemented using any known database technology. For the purposes of illustrating the principles of one embodiment of the present invention, each record in the database is assumed to contain the variables listed in Table A, below.

TABLE A

Auction:
    Auction ID
Auctioned Item:
    Item ID
    Name
    Quantity
    Description
Mechanism:
Auction Format
    Reserve price
Bidders:
    Bidder ID
    Segment ID
Bids:
Identities of participating bidders
Bids submitted by participating bidders
Outcomes:
    Assigned payments for each bidder
    Assigned quantities for each bidder For each bidder, the database contains a segment identity (ID). Alternatively, in another embodiment, further data on bidder-specific covariates that can be used for classifying the bidders and assigning segment identifiers. Some examples are E-bay rating, consumer individual flexibility rating, credit worthiness, income, occupation, or residential locale, and other special individualized ratings.

Bidding model repository 12 stores a variety of bidding models. The bidding model repository can also be implemented using any known database technology.

A bidding model specifies bidding behavior as a function of information held by a bidder and the characteristics of the market structure. The market structure can be decomposed into two parts: characteristics of the auction mechanism and characteristics of the environment. These terms are explained in detail as follows.

Part of the information held by a bidder is inherently private, that is, is known only by the bidder himself/herself and not observed by other participants. For example, a bidder's willingness to pay for the auctioned item is known only by the bidder himself/herself. Another example of private information is that, in a procurement auction for a project, each bidder typically has private information about the cost he/she would incur to deliver the project if he/she wins the auction. From the point of view of other participants, the private information of bidder "i" is a random variable with some probability distribution.

"Market structure" is intended to mean a collection of variables that describe the factors that may affect the bidding behavior of bidders. A market structure is characterized by two sets of variables: a first set of variables collectively describes the auction "environment," and a second set of variables collectively describes the auction "mechanism."

The first set of variables provides a description of the auction "environment." These variables include the number and other characteristics of bidders, the number and other characteristics of the auctioned item(s). For the purposes of illustrating the principles of this invention, we will take the number of items auctioned to be one.

In an auction with k groups of bidders with $n_i$ bidders in group i where $i=1, \ldots, k$, let $F_i(v)$ denote the cumulative distribution of private signal of a representative bidder in group i. Here v denotes a bidder's private signal (typically interpreted as bidder i's willingness to pay for the item e.g., his valuation of the item). The interval $(a_i, z_i)$ denotes the range of possible values for this random variable for bidder group i.

For the purposes of illustrating the principles of this invention, the auction "environment" can be denoted by a list such as: $[k, (n_1, F_1, (a_1, z_1)), (n_2, F_2, (a_2, z_2)), (n_3, F_3, (a_3, z_3)), \ldots, (n_k, F_k, (a_k, z_k))]$. This list describes the number of bidder groups and the number of bidders and signal distribution of a typical bidder in each group.

The key challenge faced by the end-user of the system is that at least some elements of the market structure that describe the auction environment, namely, the distributions of bidders valuations are unobservable. Such unobservable elements are latent, and must be estimated from observable bid data on past auctions of similar items. Again, for the purposes of illustrating the principles of this invention, the number of bidder groups (k) and the number of bidders in each group $(n_1, \ldots, n_k)$ are observable, and the distributions of bidders are unobservable. The unobserved elements of the environment are its latent structure.

A second set of variables collectively provides a description of the characteristics of the market mechanism in use. These variables include auction format (e.g., English, Dutch, Vickrey, Sealed-Bid First-Price, etc.), reserve price (e.g., the lowest acceptable bid in an auction for selling an item; the highest acceptable bid in an auction for procuring an item), starting price, entry rule, bid increment rule, closing rule etc.

Representing Market Mechanism Attributes Using Lists

As is well known, holding everything else fixed, any variation in any of the dimensions of the auction mechanism can, in principle, result in variations in the submitted bids. For the purposes of illustrating the principles of this invention, mechanism characteristics can be represented by a list.

In a first example, the list:

(Format=Dutch, Reserve Price=$100 per item, Entry
Rule={By Invitation, Free}, Start Price=$500,
Bid Increment=−$1/second, Closing Rule=n/a)

describes a Dutch auction in which the bidders are the ones invited to participate in the auction, the price starts at $500 and is reduced at a rate of $1 per second until a bidder claims the item at the current price. If the price reaches $100 without any bidder claiming the item, the auction ends with no sale.

In a second example, the list:

(Format=Vickrey, Reserve Price=0, Entry Rule={By
Invitation, Free}, Start Price=n/a, Bid
Increment=n/a, Closing Rule=n/a)

describes a standard Vickrey auction with a reserve price of 0. A Vickrey auction is a sealed bid auction in which the highest bidder wins the auctioned item, and pays the second highest bid or the reserve price whichever is higher.

In a third example, the list:

(Format=Sealed Bid First Price, Reserve Price=$150
per item, Start Price=n/a, Entry Rule={Open,
Fee=$5}, Closing Rule=n/a)

describes a standard sealed-bid first-price auction in which anyone who pays $5 entry fee (and otherwise qualify) can submit a bid, which is required to be no less than $150, anytime during a specific time period. At the end of the specified period, the bidder who submitted the highest bid wins the item and pays what he bid. In this example all bidders are treated symmetrically.

Representative Bidding Models

A bidding model for an n bidder auction with a given mechanism characteristics and a given environment specifies n bid functions, $(\beta_1, \beta_2, \ldots, \beta_n)$, one for each bidder. A bidder's bid function is a relation between the private signal of the bidder and the bid he/she submits. Some examples are as follows, wherein V denotes a dummy variable indicating the private valuation of a bidder, and $\beta_j$ (V, mechanism characteristics, environment) denotes a bid function of bidder j.

In a first example, a Vickrey auction for the sale of an item is illustrated by the following exemplary bidding model:

$\beta_j$ (V, {Format=Vickrey, Reserve Price=R}, [2, $(n_1,$
$F_1, (a_1, b_1)), (n_2, F_2, (a_2, b_2))$])=V for all bidders
j.

In this example, regardless of the environment, each bidder submits a bid equal to his private valuation.

In a second example, an English auction for the sale of an item is illustrated by the following exemplary bidding model:

$\beta_j$ (V, {Format=English, Reserve Price=R}, [2, $(n_1, F_1,$
$(a_1, z_1)), (n_2, F_2, (a_2, z_2))$])=V for all bidders j.

In this example, regardless of the environment, each bidder submits a bid equal to his private valuation.

In a third example, a sealed-bid first-price auction for the sale of an item is illustrated by the following exemplary bidding model:

$\beta_j$ (V, {Format=Sealed Bid First Price, Reserve
Price=R, Bid Comparison Rule=$\{T_1(B), T_2(B)\}$},
$[2, (n_1, F_1, (a_1, z_1)), (n_2, F_2, (a_2, z_2))])=\phi_k$ (V) if j
is in bidder group k (k=1,2).

The pair of functions $(\phi_1(V), \phi_2(V))$ is obtained by solving a system of differential equations for the unknown functions $\phi_1$ (b) and $\phi_2$ (b) and then inverting these functions to get the bid functions $$\phi_1(V) = \phi_1^{-1}(V)$$

and $$\phi_2(V) = \phi_2^{-1}(V).$$

The following system of differential equations in the unknown functions $\phi_1$ (b) and $\phi_2$ (b) with the initial conditions $\phi_1$ (R)=$\phi_2$ (R)=R can be solved by using any of known numerical procedures:

$$F_1(\phi_1(b))F_2(\phi_2(b)) = [\phi_1(b)-b]\{(n_1-1)F_2(\phi_2(b))F_1'(\phi_1(b))\phi_1'(b) + n_2F_1(\phi_1(b))F_2(\phi_2(b))\phi_2'(b)\} \quad \text{(Eg. 1)}$$

$$F_2(\phi_2(b))F_1(\phi(b)) = [\phi_2(b)-b]\{(n_2-1)F_1(\phi_1(b))F_2'(\phi_2(b))\phi_2'(b) + n_1F_2(\phi_2(b))F_1'(\phi_1(b))\phi_1'(b)\}. \quad \text{(Eq. 2)}$$

In a fourth example illustrates that a bidding model for Dutch auction is the same as the bidding model in the third example directly above.

A fifth example illustrates a bidding model for sealed-bid first-price auction for the purchase of an item. In the case of auctions conducted by a buyer to purchase an item the notation V refers to the privately known cost of bidders. In a sealed-bid first-price auction for the purchase of an item the lowest bidder wins the auction and receives what he bid as payment. The bidding model for this case is as follows:

$\beta_j$ (V, {Format=Sealed Bid First Price, Reserve
Price=R}, $[2, (n_1, F_1, (a_1, Z_1)), (n_2, F_2, (a_2, z_2))])=$
$\phi_k$ (V) if j is in bidder group k (k=1,2).

The pair of functions $(\phi_1(V), \phi_2(V))$ is obtained by solving a system of differential equations for the unknown functions $\phi_1$ (b) and $\phi_2$ (b) and then inverting these functions to get the bid functions $\phi_1(V) = \phi_1^{-1}(V)$ and $\phi_2(V) = \phi_2^{-1}(V)$. The following system of differential equations in the unknown functions $\phi_1(b)$ and $\phi_2(b)$ with the initial conditions $\phi_1(R)=\phi_2(R)=R$ can be solved by using any of known numerical procedures:

$$[1-F_1(\phi_1(b))][1-F_2(\phi_2(b))]=[b-\phi_1(b)]\{(n_1-1)[1-F_2(\phi_2(b))]F_1'(\phi_1(b))\,\phi_1'(b)+n_2[1-F_1(\phi_1(b))]F_2'(\phi_2(b))\phi_2'(\pi(b))\} \quad \text{(Eq. 1')}$$

$$[1-F_2(\phi_2(b))][1-F_1(\phi_1(b))]=[b-\phi_2(b)]\{(n_2-1)[1-F_1(\phi_1(b))]F_2'(\phi_2(b))\,\phi_2'(b)+n_1[1-F_2(\phi_2(b))]F_1'(\phi_1(b))\phi_1'(b)\} \quad \text{(Eq. 2')}$$

Furthermore, in one embodiment, the system uses input data supplied by the user of the system. This data includes, for example:

- a set of item(s) to be auctioned (Example: A Brand New 19 inch Ultra VGA HP Monitor, A Refurbished HP Kayak Desktop Computer with Intel Pentium III 850 Mhz, 128 M RAM, 40 G hard disk).
- an evaluation criterion for ranking alternative bids (Example 1: Expected payoff. Example 2: A weighted average, or ratio, of the expected payoff to the standard deviation of the payoff).
- a set of auction the user is interested in, including a description of the item(s), a description of the rules of the auction, and a description of the number and other characteristics of rival bidders.
- initial valuations for the item(s) to be bid on (Example: bidder's valuation of {A Brand New 19 inch Ultra VGA HP Monitor, A Refurbished HP Kayak Desktop Computer with Intel Pentium III 850 Mhz, 128 M RAM, 40 G hard disk}).
- a set of relevant constraints on the bidding strategies (Example: upper and lower bounds).

Exemplary Processes

FIGS. 3-7 are flowcharts illustrating processes 30, 40, 50, 60 and 70, respectively, of steps performed in accordance with one embodiment of the present invention for determining an optimum bid for an auction. FIGS. 3-7 illustrate processes of the present invention which, in one embodiment, are carried out by processors and electrical and electronic components under the control of computer readable and computer executable instructions. The computer readable and computer executable instructions reside, for example, in data storage features such as computer usable memory 810 and/or processor 850, and/or storage unit 815 of computer system 800 of FIG. 8. However, the computer readable and computer executable instructions may reside in any type of computer readable medium. Although specific steps are disclosed in flowcharts 40-90, such steps are exemplary. That is, the present invention is well suited to performing various other steps or variations of the steps recited in FIGS. 3-7. Within the present embodiment, it should be appreciated that the steps of flowcharts 30-70 may be performed by software, firmware, or hardware or any combination thereof.

With reference again to FIG. 1, the system includes a Historical Auction Data Repository 11, a Bidding Model Repository 12, a Structure Extractor Module 13, a Bid Calculator Module 14, and a Report Generator Module 15.

Figure 2:
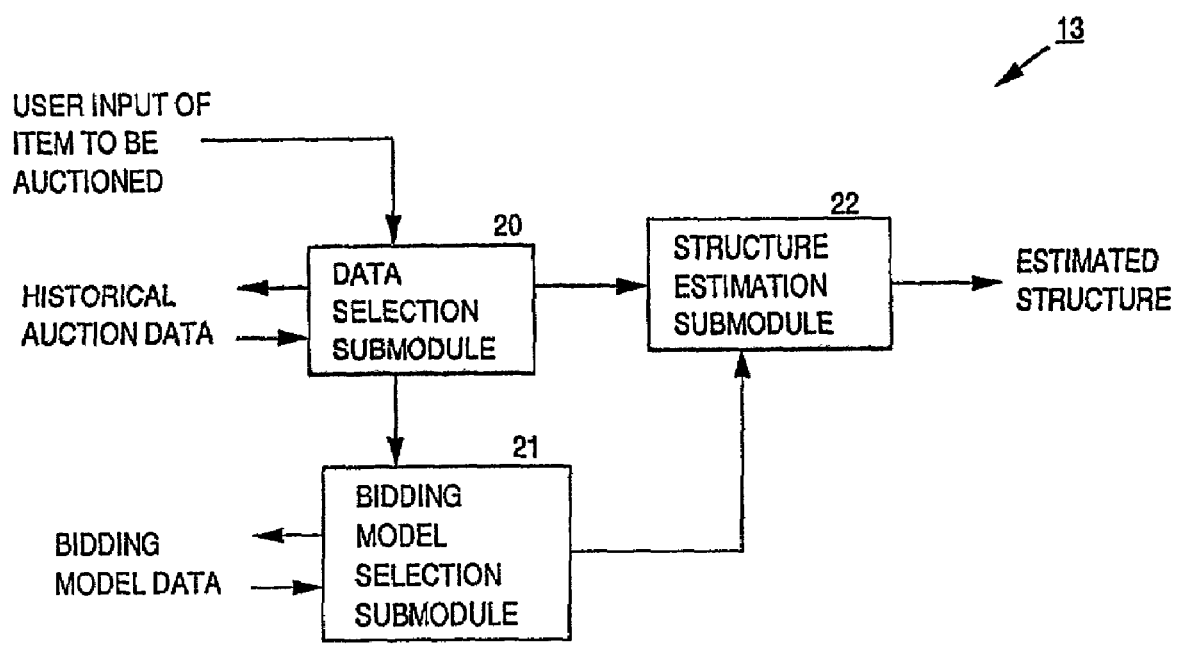
FIG. 2 shows in block diagram form the structure of the structure extractor of the decision support system of FIG. 1, in accordance with one embodiment of the invention.

With reference to FIG. 2, Structure Extractor Module 13 has three submodules, a Data Selection Submodule 20, a Bidding Model Selection Submodule 21, and Structure Estimation Submodule 22.

Structure Extractor Module 13 estimates the unobserved structural elements of the market structure. Structure Extractor 13 is connected to the Historical Auction Data Repository 11 and the Bidding Model Repository 12. Structure extractor module 13 has three submodules, a Data Selection Submodule 20, a Bidding Model Selection Submodule 21, and a Structure Estimation Submodule 22.

Figure 6:
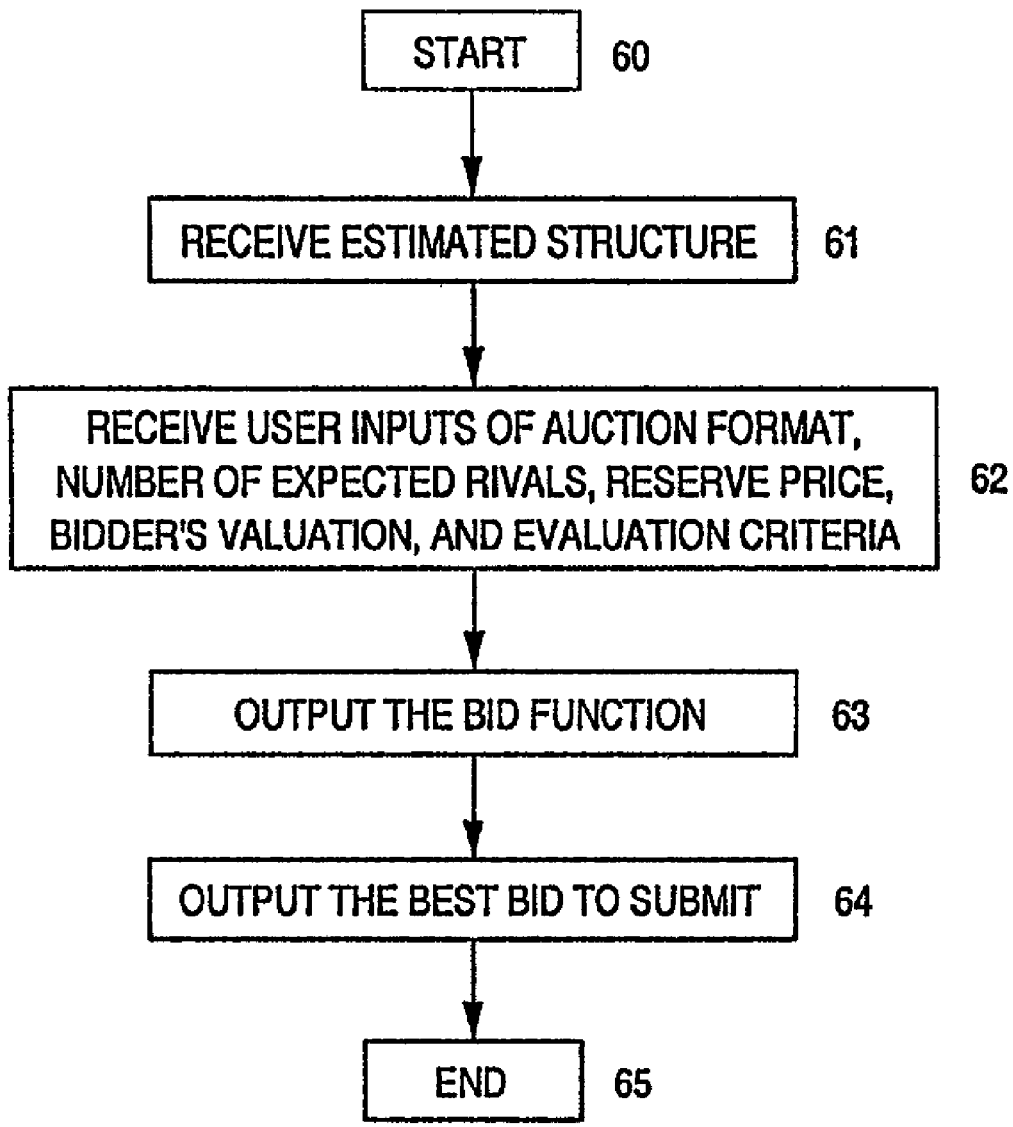
FIG. 6 is a flow chart of the steps in a process for determining the best bid to submit in an auction, in accordance with one embodiment of the invention.
Figure 7:
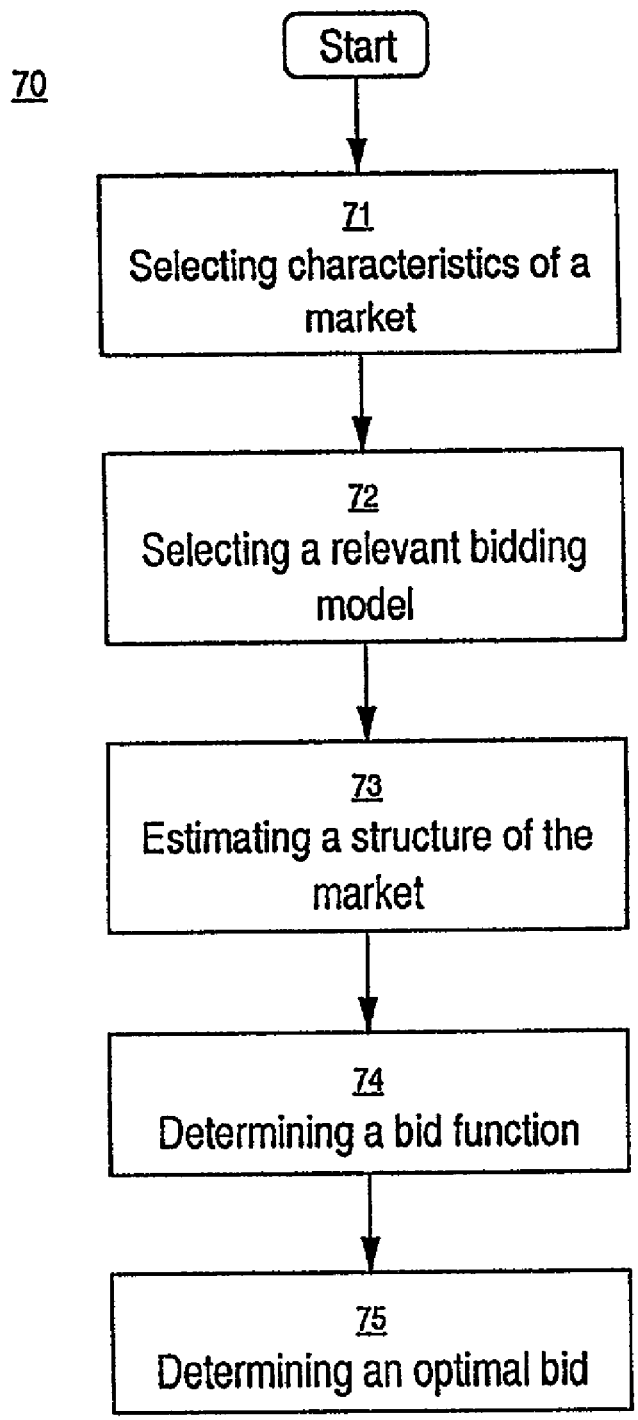
FIG. 7 is a flow chart of the steps in a process for determining an optimal bid in an auction, in accordance with one embodiment of the present invention.

FIG. 7 illustrates the steps in a process 70 for determining an optimal bid for an item(s) in an auction, in accordance with one embodiment of the present invention. At step 71 of process 70, characteristics of the market (e.g., auction) are selected. Step 71 is described below in detail in process 30 of FIG. 3. At step 72, a relevant bidding model is selected. Step 72 is described below in detail in process 40 of FIG. 4. At step 73, a structure of the market is estimated. Step 73 is described below in detail in process 50 of FIG. 5. At step 74, a bid function is determined. Step 74 is described below in detail in process 60 of FIG. 6. At step 75, an optimal bid is determined. Step 75 is described below in detail in process 60 of FIG. 6.

Referring now to FIG. 3, the steps in a process 30 to effectuate a method of generating auction characteristics data are described, in accordance with one embodiment of the present invention. Reference is also made continually in the following discussion to elements depicted in FIGS. 1 and 2. Beginning with step 31, Data Selection Submodule 20 receives the user input of item(s) to be auctioned.

For each of the items specified by the user, in step 32, it then accesses the historical auction data repository 11 to extract data on auctions of similar items. The extracted records are formed into Bids Data that contain bids, bidder segment identifiers and auction mechanism characteristics.

Data Selection Submodule 20 passes the Bids Data, in step 33, to the Structure Estimation Submodule 22. Data Selection Submodule 20 passes the auction mechanism characteristics data and the bidder segment data to the Bidding Model Selection Submodule 21. Bidding Model Selection Submodule 21 computes the number of bidder segments and the number of bidders in each segment for each value of the mechanism characteristics data and retrieves the appropriate bidding model from the bidding model repository (e.g., repositories 11 or 12 of FIG. 1).

As an example, suppose that historical auction data repository contains data on past auctions of the specified item. Suppose also that in all of the past auctions the bidders belong to one of two segments with five bidders in each segment 1 and three bidders in segment 2. Some of these auctions are run under English format, and some are run under a sealed-bid first-price format. In this example, Bidding Model Selection Module 21 retrieves two bidding models and passes to the Structure Estimation Submodule 22. These bidding models are:

$\beta_j(V, \{\text{Format=English, Reserve Price=0}\},[2,(5,F_1,(a_1,b_1)),(3,F_2,(a_2,b_2))])=V$ for all bidders $j$  MODEL 1:

and $\beta_j(V, \{\text{Format=Sealed Bid First Price, Reserve Price=0}, [2, (5, F_1, (a_1, b_1)), (3, F_2, (a_2, b_2))]\})=\phi_k(V)$ if $j$ is in segment $k$ ($k=1,2$) where ($\phi_1(V), \phi_2(V)$) is the obtained from the solution to the differential equation system described above.  MODEL 2:

Structure Estimation Submodule 22 first inverts the received models to express the unobserved V in terms of observed bids. In the case of English and Vickrey auctions this inversion is trivial and the unobserved valuation of bidder j is equal to his bid: $v_j=b_j$.

In the case of sealed-bid first-price auctions this inversion is achieved as follows. The differential equation system (Eq. 1)-(Eq. 2) above is rewritten in the following equivalent form:

$$V_1 = b + [G_1(b)G_2(b)]/[(n_1-1)G_2(b)G_1'(b) + n_2 G_1(b)G_2'(b)] \quad \text{(Eq. 3)}$$

$$V_2 = b + [G_2(b)G_1(b)]/[(n_2-1)G_1(b)G_2'(b) + n_1 G_2(b)G_1'(b)] \quad \text{(Eq. 4)}$$

where $G_1$ (b) and $G_2$ (b) are the distributions of bids for a bidder in segment 1 and segment 2, respectively. The equations (Eq. 3)-(Eq. 4) express the unobserved valuations in terms observable bid distributions of bidders in the two segments.

Structure Estimation Submodule 22 performs the following steps to estimate the unknown structural elements $F_1$ (V) and $F_2$ (V):

Step 1

Obtain estimates of $G_1$ (b), $G_2$ (b), $G_1'$ (b) and $G_2'$ (b) nonparametrically by employing any of a number of known statistical estimation methods. These methods include, but are not limited to, kernel methods and local polynomial estimation methods. Denote these estimates by $\hat{G}_1$ (b), $\hat{G}_2$ (b), $\hat{G}_1'$ (b), and $\hat{G}_2'$ (b). Let $\theta_1$ (b) denote the expression on the right hand side of Eq. 3 obtained by replacing the functions $G_1$ ( ), $G_2$ ( ), $G_1'$ ( ) and $G_2'$ ( ) by their estimates $\hat{G}_1$ ( ), $\hat{G}_2$ ( ), $\hat{G}_1'$ ( ), and $\hat{G}_2'$ ( ). Similarly, let $\theta_2$ (b) denote the expression on the right hand side of Eq. 4 obtained by the same process.

Step 2

For each bidder j obtain an estimate of his valuation $v_j$ as follows:

If bidder j is in segment 1, $v_j = \theta_1$ ($b_j$) where $b_j$ is the bid submitted by bidder j.

If bidder j is in segment 2, $v_j = \theta_2$ ($b_j$) where $b_j$ is the bid submitted by bidder j.

Step 3

Obtain estimates of the unknown structural elements $F_1$ (V) and $F_2$ (V) nonparametrically by employing any of a number of known statistical estimation methods. Let ($\hat{F}_1$(V), $\hat{F}_2$(V)) denote these estimates. If the elements (($a_1$, $z_1$), ($a_2$, $z_2$)) are unknown, the valuation estimates constructed in step 2 above can also be used to get estimates of the elements (($a_1$, $z_1$), ($a_2$, $z_2$)) by using any of a number of well-known statistical procedures.

In step 34, Structure Estimation Submodule 22 outputs the estimated structure ($\hat{F}_1$(V), $\hat{F}_2$(V)) to the Bid Calculator Module 14 and to the Report Generator Module 15, completing process 30.

Figure 4:
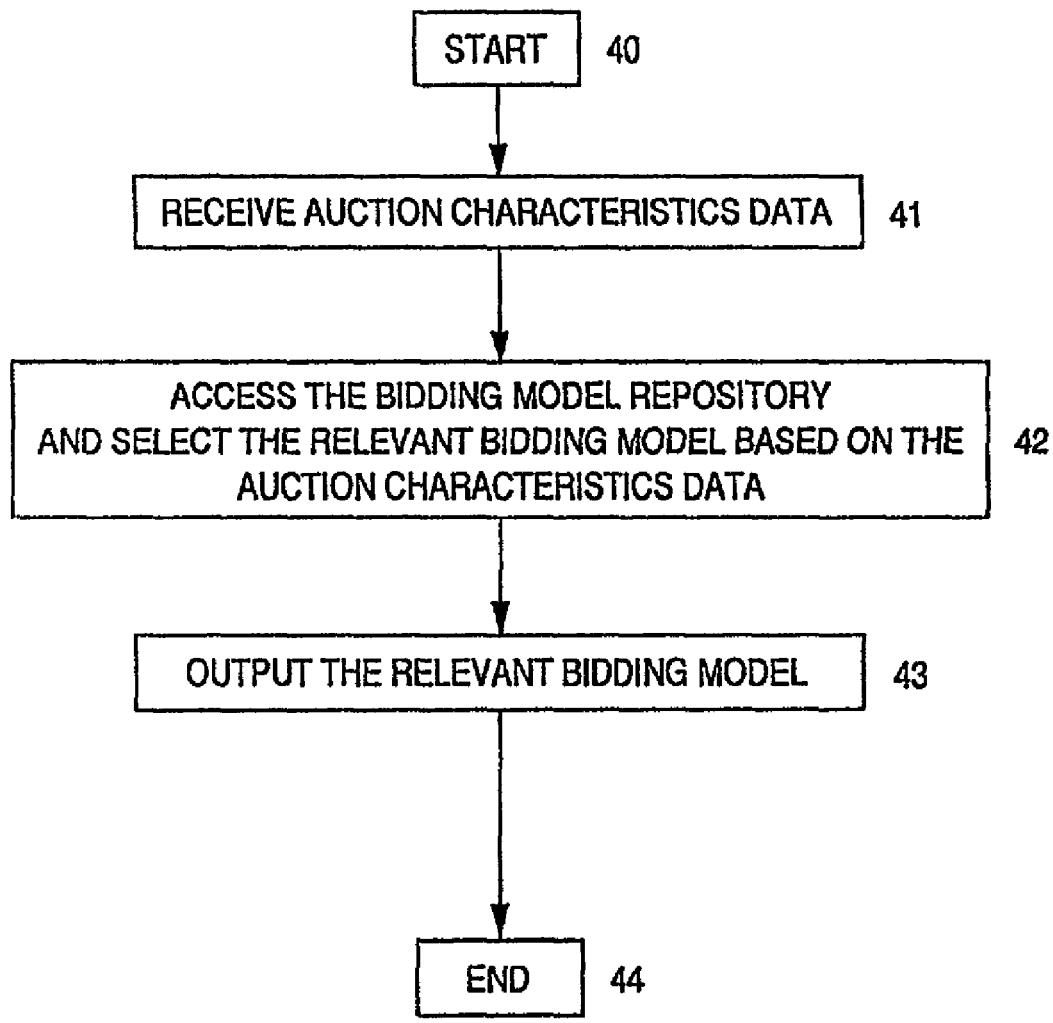
FIG. 4 is a flow chart of the steps in a process for generating a relevant bidding model, in accordance with one embodiment of the invention.

Referring now to FIG. 4, a process 40 effectuates the determination of a relevant bidding model, in accordance with one embodiment of the present invention. Reference is also made continually in the following discussion to elements depicted in FIGS. 1 and 2. At step 41, process 40 begins with Bidding Calculator 14 receiving auction mechanism characteristics and user specified information as input. The user specified information may include, but is not limited to: 1) a set of auction the user is interested in, including a description of the item(s), a description of the rules of the auction, and a description of the number and other characteristics of rival bidders; 2) initial valuations for the item(s); 3) a set of relevant constraints on the bidding strategies (e.g., upper and lower bounds); and a set of evaluation criterion for ranking the alternative bidding strategies.

At step 42, this information is passed to the Bidding Model Selection Submodule 21. Bidding Model Selection Submodule 21 retrieves the appropriate bidding model from the Bidding Model Repository 12.

At step 43, Structure Extractor Module 13 outputs the predicted bidding behavior to the Bid Calculator 14, completing process 40.

Figure 5:
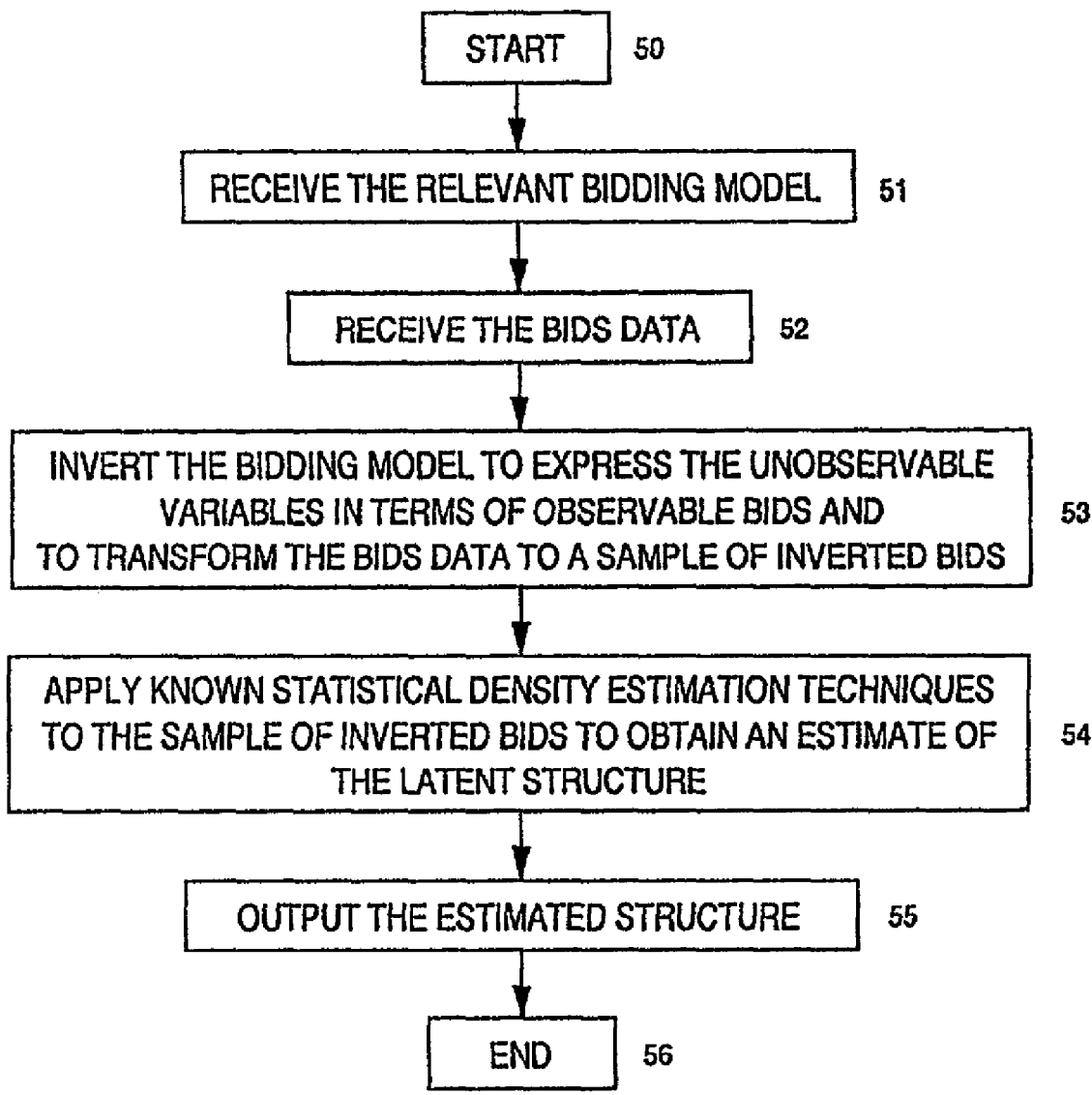
FIG. 5 is a flow chart of the steps in a process for generating an estimated market structure, in accordance with one embodiment of the invention.

The following is an exemplary application of a process 50, for determining an estimated market structure, in accordance with one embodiment of the present invention. With reference to FIG. 5 (as well as to FIGS. 1 and 2 for elements denoted therein), a user specifies that the auction mechanism to be used is a sealed-bid first price auction with a reserve price of $300, and three bidders from segment 1 and four bidders from segment 2. The corresponding predicted bidding behavior, determined via process 50, is $$\hat{\beta}_j (V, \{\text{Format=Sealed Bid First Price, Reserve Price=300}, [2, (3, \hat{F}_1(V), (a_1, z_1)), (4, \hat{F}_2(V), (a_2, z_2))]\}) = \phi_k(V)$$

where $\phi_k$(V) is obtained from the differential equation system described above with the initial condition $\phi_1$ (300)=$\phi_2$ (300)= 300.

In step 51, the Bid Calculator 14 receives the estimated structure ($\hat{F}_1$(V), $\hat{F}_2$(V)) from the Structure Estimation Submodule 22. It also receives user inputs of 1) a set of auction the user is interested in, including a description of the item(s), a description of the rules of the auction, and a description of the number and other characteristics of rival bidders; 2) initial valuations for the item(s); 3) a set of relevant constraints on the bidding strategies (e.g., upper and lower bounds); and a set of evaluation criterion for ranking the alternative bidding strategies; step 52.

Bid calculator 14 has each of the alternative bidding strategies, together with the auction parameters as well as the estimated structure ($\hat{F}_1$(V), $\hat{F}_2$(V)), and receives predicted bidding behavior $\hat{\beta}_j$ (V, . . . ) for each of the alternative bidding strategies. Bid Calculator 14 then calculates the evaluation criterion for each of the alternative bidding strategies by substituting the predicted bidder behavior and the estimated structural elements; step 53.

The Bid Calculator 14 calculates the optimized value of the evaluation criterion for each of the alternative bidding strategies by selecting the values of the free parameters subject to the user-specified constraints; step 54. Bid Calculator 14 also calculates descriptive statistics (mean and variance) for the value of the evaluation criterion for each of the alternative bidding strategies and ranks the alternative bidding strategies.

The Report Generator Module 15 receives the estimated structure from the Structure Estimation Submodule 22 and the rankings and descriptive statistics of the predicted outcome for each of the alternative bidding strategies under consideration and presents this information in the form of a tabular and/or graphical report; step 55. Alternatively, the Report Generator Module 15 reports the best bid to an external auction implementation system specified by the user so that the specified item can be bid on under the optimal bid.

Referring now to FIG. 6, the steps in a process 60 for determining the best bid to submit in an auction, in accordance with one embodiment of the invention. Beginning with step 61, the estimated market structure is received, as discussed above (process 50 of FIG. 5).

At step 62, user inputs are received, as discussed above. In one embodiment, the user inputs include: 1) a set of auction the user is interested in, including a description of the item(s), a description of the rules of the auction, and a description of the number and other characteristics of rival bidders; 2) initial valuations for the item(s); 3) a set of relevant constraints on the bidding strategies (e.g., upper and lower bounds); and a set of evaluation criterion for ranking the alternative bidding strategies; step 52.

At step 63, Bid Calculator 14 generates the bid function. Following are three examples of how the Bid Calculator 14 determines the bid function and which bid is the best bid to submit. In these examples, the inputs are the structure of the auction given by the structure extractor, as well as some user inputs as described above in steps 61 and 62.

The determination of the bid function involves statistical estimation of the unknown structural elements, such as the probability distributions F( ) of the bidders' values and the utility function U( ) of the bidders. The utility function is a mathematical construct used to measure a person's risk attitude; it maps a wealth level into a utility of that wealth.

The output includes a bid function that specifies the amount a bidder with value v should bid, as a function of v. This amount is calculated to optimize the value of the user-specified criterion, for example, the expected payoff $$U(v-\text{transaction price}) \cdot \text{Prob} \{\text{bid b wins the auction}\},$$

or the expected payoff divided by the standard deviation of the payoff. The output may also include a table of values of the criterion at alternative (non-optimal) bids. In all the following examples, the criterion chosen is the expected payoff.

In a first example, suppose there are k symmetric and risk neutral bidders, who have independent and private values (IPV). Mathematically, risk neutrality means that the utility U(w) associated with a wealth of w is a linear function of w. Suppose the distribution function of a bidder's value is F(•), where F(x) is the proportion of bidders who are unwilling to pay more than x for the item. If the auction is a sealed bid first price auction (FPA) with reserve price r, a bidder with value v>r should place a bid of $$b = v - \frac{\int_r^v F^{k-1}(x)dx}{F^{k-1}(v)}$$

In the special case of values uniformly distributed over the interval from 0 to a, so that F(x)=x/a, and a reservation price of 0, the bids are related to values by the equation $$b = \left[\frac{k-1}{k}\right]v$$

In a second example, consider the same setup as the first example, except assume that bidders are risk averse with concave utility function given by $U(w)=w^\rho$, where $\rho$ is a parameter between 0 and 1 that has been estimated by the market structure extractor. In this case, a bidder with value v>r should bid $$b = v - \frac{\int_r^v F^{(k-1)/\rho}(x)dx}{F^{(k-1)/\rho}(v)}$$

The interpretation of this is that each bidder behaves as if he/she was risk neutral and faced (k−1)/ρ risk neutral rivals.

In a third example, suppose the auction is a sealed bid second price auction. Then a bidder with value v>r should bid $$b=v$$

that is, he/she bids as much as he/she is willing to pay. Note that this bid function does not depend on his risk attitude, the number of rivals, their values or their risk attitudes. This also applies for a Vickrey auction, where there are multiple items to be sold and the winners pay the highest losing bid.

At step 64, the best bid to submit is then determined and outputted. This completes process 60.

The Report Generator 15 takes the outputs of the structure extractor and bid calculator and presents the information contained in them to the bidder. An example of a report generated is provided as follows in Table B:

TABLE B

Inputs:
    Auction format: sealed bid first price
    Reserve price: $10
    Number of bidders: 5
    Your valuation: $50
    Bidders' risk attitude: ρ = 0.5
    . . . (other characteristics of market structure/auction)
Payoff Characteristics:

| | | | | | |
|---|---|---|---|---|---|
| Bid amount b | $10 | $20 | $30 | $40 | ... |
| Probability that bid b wins the auction | .1 | .2 | .5 | .7 | ... |
| Expected payoff π | 0.63 | 1.10 | 2.24 | 2.21 | ... |
| Standard deviation of payoff | 1.90 | 2.19 | 2.24 | 1.45 | ... |

Maximum expected payoff π = 2.24.
Bid amount that maximizes expected payoff b = 30.

Referring to Table B, the bidder may decide to pick b=30, the value that yields the maximum expected payoff, or he may decide to pick b=40, which yields a payoff that has a slightly lower expected value, but also has the advantage of being less variable. The best bid to submit is determined as an optimization of the evaluation criterion, in this case the maximum expected payoff. A bidder may select any number of evaluation criterion. For example, a bidder may selected the evaluation criterion as some weighted average of the expected payoff and the standard deviation of the payoff.

Exemplary System Platform

Exemplary Computer System

Figure 8:
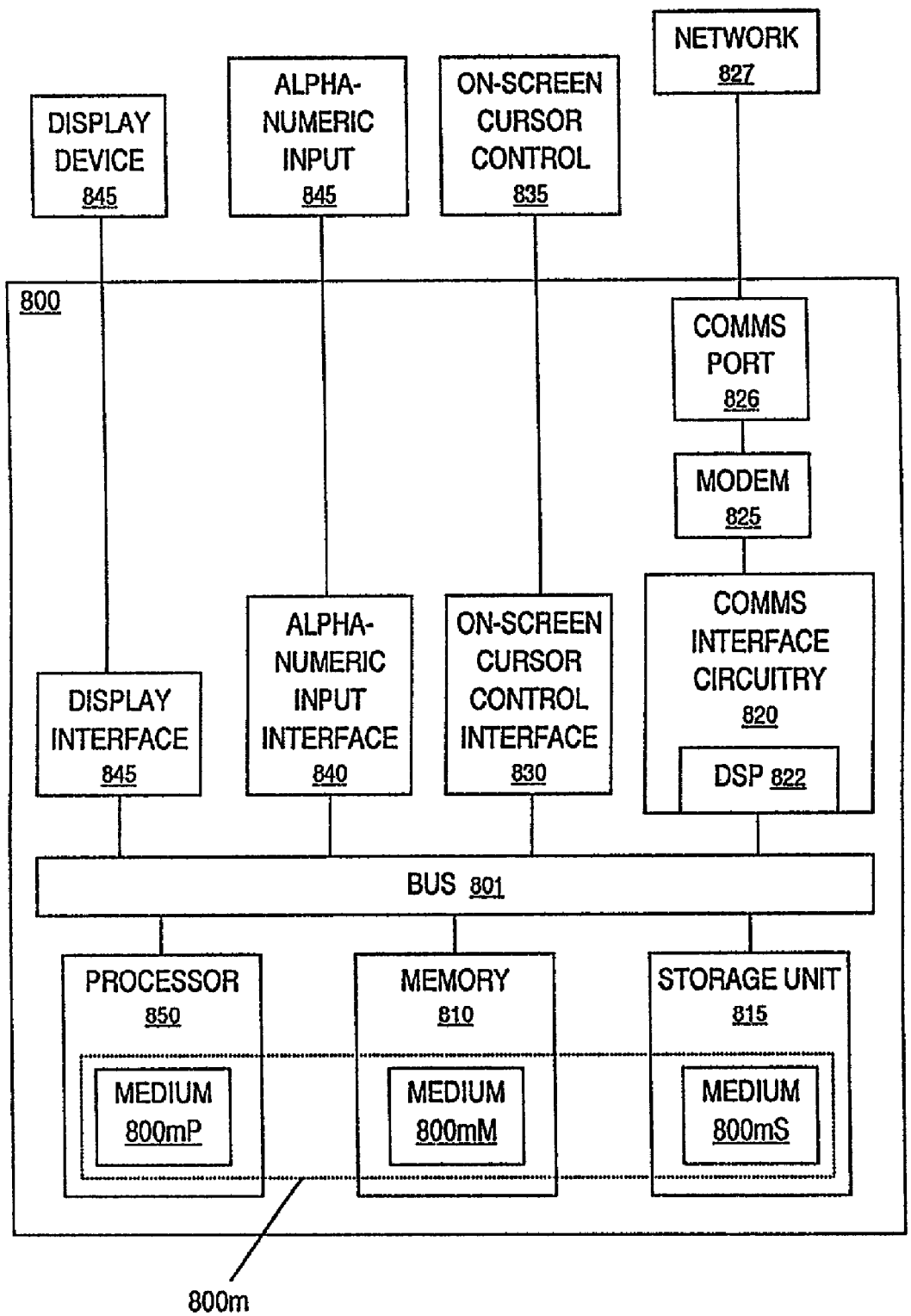
FIG. 8 is a block diagram depicting a computer system and computer readable media for implementing processes of optimal bid determination, in accordance with one embodiment of the invention.

FIG. 8 is a block diagram depicting a computer system 800 and a computer readable media 800m for implementing processes of optimal bid determination, in accordance with one embodiment of the invention.

With reference to FIG. 8, computer system 800 includes a bus 801 for communicating information, a central processor 850 coupled with the bus 801 for processing information and instructions, and a memory unit 810 (e.g., random access memory and/or read only memory) and a data storage system 815 coupled with the bus 801 for storing information and instructions. Data storage system 815 may be any magnetic and/or optical disc and drive/reader, or any other data storage device.

In one embodiment of the present invention, the processes described, including but not limited to determination of an optimal bid in an auction (e.g., Process 700, FIG. 7), may be executed by processor 850, which may be an application specific integrated circuit (ASIC). Alternatively, these methods may be implemented by processor 850 executing a program stored in memory 810 and/or data storage system 815. It is appreciated that computer system 800 may implement the invention by combinations of these schemes, or by alternatives other than those pictured. It is also appreciated that computer system 800 can include other elements not shown. It is further appreciated that computer system 800 may be constituted by any functional equivalent, or by any viable alternative architecture.

In the present embodiment, computer system 800 includes a communications device 825. Communications device 825 may be a modulator/demodulator (MODEM). Communications device 825 enables communication via a communications port 826.

In the present embodiment, computer system 800 may be communicatively coupled with an external network 827, via communications port 826. External network 827 may be a local area network (LAN), or any other feasible network configuration, and may include other networks including wide area networks (WAN) and the Internet 899.

Computer system 800 executes, in one implementation, a program embodied in a computer readable medium 800*m* which may be deployed in and/or to various degrees between processor 850 (e.g., as 800 mP), memory 810 (e.g., as 800 mM), and storage unit 815 (e.g., as 800 mS). In the present implementation, execution of this program by computer system 800 enables a process, which implements a method for analyzing new auction formats, outcomes, and rules, from limited and partially observable bidder characteristics and by utilizing any known results on some aspects of the new auction rules.

In one embodiment, bidder characteristics, auction outcomes and formats, and accompanying rules may be archived in, written to, retrieved from, and modified within a database (e.g., repositories 11 and 12 of FIG. 1). In one embodiment, the database may be deployed within computer readable medium 800*m*.

In the present embodiment, system 800 also optionally contains a display interface 845 coupled to the bus 801 for enabling incorporation of a display device 846. Display device 846 enables displaying information to users. In one embodiment, display interface 845 may be a graphical user interface (GUI). In one embodiment, display interface 805 enables an auction input interface. In one embodiment, aspects of display interface 845 may be deployed within computer readable medium 800*m*.

System 800 may include an alphanumeric input interface 840 coupled to the bus 801 for enabling incorporation of an alphanumeric input device 841. Alphanumeric input device 841 can communicate information and command selections to processor 850 via alphanumeric input interface 840 and bus 801.

System 800 also includes an optional cursor control or directing device (on-screen cursor control 836) coupled to bus 801 via on-screen cursor control interface 830, for communicating user input information and command selections to processor 850. In one implementation, on-screen cursor control 836 is a mouse, trackball, joystick or special keys on alphanumeric input device 841 capable of signaling movement of a given direction or manner of displacement.

Input interface 840 and cursor control 836 may both function, individually or in concert, as enabling mechanisms of a auction input.

In one embodiment, computer system 800 may be a PC, a desktop, a laptop, or another implementation such as a mainframe or supercomputer. In another embodiment, computer system 800 may be another computer platform, including, but not limited to PC type platforms, Macintosh, UNIX, servers, and workstations of various types. In yet another embodiment, computer system 800 may be a portable computer platform, such as a PDA, palmtop computer, or the like. In another embodiment, system 800 may be any other intelligent electronic system capable of implementing computer functions, such as cellular telephones, two-way pagers, other pagers, other data and communication systems, and other information processing platforms with auction capabilities.

Exemplary Database

FIGS. 9*a-g* depict the contents of an exemplary database of market data, in accordance with one embodiment of the invention. The exemplary database herein contains information about past auctions and market participants. In one embodiment of the present invention, the following variables are observed for each auction in the database, as shown in FIGS. 9*a-g*. Auction data includes the auction identification and other characteristics thereof. Information about the auctioned item includes its identity, its name, quantity, description, and other attributes. The market mechanism contains data about the auction format, reserve price, preference policy, and other mechanism attributes. Bidders are identified by bidder and segment identity and other attributes. Bids are categorized by the identities of participating bidders and the bids submitted by them. Outcomes listed include assigned payments and quantities for each bidder. These are detailed in FIGS. 9*a-g*.

In summary, the present invention provides an automated estimation and optimization solution for selecting the best bid in an auction. An embodiment of the present invention provides a method and system that provides automated decision support for selecting the optimal bid based on structural analysis of data from related auctions. An embodiment of the present invention provides a method and system that determines the latent elements of the auction environment taking into account the strategic and information conditions with minimal assumptions on the distributions of unobserved random elements. An embodiment of the present invention provides a method and system that enables a bidder either buying an item or participating in a procurement auction to identify and estimate empirically the unknown elements of the market structure and to factor this information into his decisions regarding the appropriate optimal bid.

In one embodiment of the present invention, structural analysis of bid data from prior auctions is used to identify and estimate the distributions of bidders' private signals conditional on observable bidder characteristics. In one embodiment, the estimated signal distributions, identified by the structural analysis, are used to evaluate alternative bid functions and to select the best bid. In one embodiment, the present invention provides decision support tools to determine an optimal bid based on structural econometric analysis of available data on the market environment. The present invention allows a decision-maker to estimate the unobservable private signals of the rival bidders and to determine the optimal bid the bidder should make for a particular item(s).

A preferred embodiment of the present invention, a method and system for selecting an optimal bid in an auction, is thus described. While the present invention has been described in particular embodiments, it should be appreciated that the present invention should not be construed as limited by such embodiments, but rather construed according to the below claims.

What is claimed is:

1. A computer implemented method for determining an optimal bid for an item in a market, said method comprising:
   a) selecting characteristics of said market;
   b) selecting user-specific auction evaluation criterion;
   c) selecting a bidding model, wherein the bidding model specifies bidding behavior as a function of information held by a bidder and the characteristics of the market;
   d) estimating a structure of said market, wherein unobservable variables are expressed in terms of observable bids by inverting said bidding model;

e) determining a bid function, wherein the bid function is determined based on the structure of said market and user inputs regarding item being bid and characteristics of rival bidders; and f) determining by a processor said optimal bid, which is a prediction of an amount a bidder should bid, wherein said optimal bid is calculated based upon the received evaluation criteria and said bid function.

2. The method as recited in claim 1, wherein said step a) comprises:
receiving a first user input, wherein said first user input comprises information identifying an item to be bid on;
accessing a database;
retrieving historical bids data from said database;
retrieving auction characteristics data from said database, wherein said auction characteristics data comprise information relating to historical auctions of items similar to said item to be bid on;
outputting said historical bids data; and
outputting said auction characteristics data.

3. The method as recited in claim 1, wherein said step b) comprises:
receiving auction characteristics data;
accessing a database;
retrieving from said database said bidding model;
wherein said bidding model is selected based on a corresponding relevance of said auction characteristics data; and
outputting said bidding model.

4. The method as recited in claim 1, wherein said step c) comprises;
receiving said bidding model; receiving historical bids data;
transforming said historical bids data to a sample of inverted bids, wherein said historical bids data are transformed by inverting said bidding model;
estimating a structure of said market, wherein said sample of inverted bids receives application of statistical density estimation techniques to obtain said structure; and
outputting said structure.

5. The method as recited in claim 1, wherein said step d) comprises:
receiving a second user input;
receiving a structure;
generating a bid function, wherein said bid function is based on said structure and said second user input; and
outputting said bid function.

6. The method as recited in claim 5, wherein said second user input comprises:
an auction format; a valuation of said item; and an expected number of rival bidders.

7. A computer system comprising:
a bus;
a memory interconnected with said bus; and
a processor interconnected with said bus, wherein said processor executes a method for determining an optimal bid for an item n a market, said method comprising:
a) selecting characteristics of said market;
b) selecting user-specific auction evaluation criterion;
c) selecting a bidding model, wherein the bidding model specifies bidding behavior as a function of information held by a bidder and the characteristics of the market;
d) estimating a structure of said market, wherein unobservable variables are expressed in terms of observable bids by inverting said bidding model;

e) determining a bid function wherein the bid function is determined based on the structure of said market and user inputs regarding item being bid and characteristics of rival bidders; and f) determining said optimal bid, which is a prediction of an amount a bidder should bid, wherein said optimal bid is calculated based upon the received evaluation criteria and said bid function.

8. The computer system as recited in claim 7, wherein said step a) comprises:
receiving a first user input, wherein said first user input comprises information identifying an item to be bid on;
accessing a database;
retrieving historical bids data from said database;
retrieving auction characteristics data from said database, wherein said auction characteristics data comprise information relating to historical auctions of items similar to said item to be bid on;
outputting said historical bids data; and
outputting said auction characteristics data.

9. The computer system as recited in claim 7, wherein said step b) comprises:
receiving auction characteristics data; accessing a database;
retrieving from said database said bidding model, wherein said bidding model is selected based on a corresponding relevance of said auction characteristics data; and
outputting said bidding model.

10. The computer system as recited in claim 7, wherein said step c) comprises:
receiving said bidding model; receiving historical bids data;
transforming said historical bids data to a sample of inverted bids, wherein said historical bids data are transformed by inverting said bidding model;
estimating a structure of said market, wherein said sample of inverted bids receives application of statistical density estimation techniques to obtain said structure; and
outputting said structure.

11. The computer system as recited in claim 7, wherein said step d) comprises:
receiving a second user input; receiving a structure;
generating a bid function, wherein said bid function is based on said structure and said second user input; and
outputting said bid function.

12. The method as recited in claim 11, wherein said second user input comprises:
an auction format; a valuation of said item; and an expected number of rival bidders.

13. A computer readable medium for causing a computer system to execute the steps in a computer implemented method for determining an optimal bid for an item in a market, said method comprising:
a) selecting characteristics of said market;
b) selecting user-specific auction evaluation criterion;
c) selecting a bidding model, wherein the bidding model specifies bidding behavior as a function of information held by a bidder and the characteristics of the market;
d) estimating a structure of said market, wherein unobservable variables are expressed in terms of observable bids by inverting said bidding model;
e) determining a bid function, wherein the bid function is determined based on the structure of said market and user inputs regarding item being bid and characteristics of rival bidders; and
f) determining by a processor said optimal bid, which is a prediction of an amount a bidder should bid, wherein said optimal bid is calculated based upon a received evaluation criteria and said bid function.

14. The computer readable medium as recited in claim 13, wherein said step a) comprises:
   receiving a first user input, wherein said first user input comprises information identifying an item to be bid on;
   accessing a database;
   retrieving historical bids data from said database;
   retrieving auction characteristics data from said database, wherein said auction characteristics data comprise information relating to historical auctions of items similar to said item to be bid on;
   outputting said historical bids data; and
   outputting said auction characteristics data.

15. The computer readable medium as recited in claim 13, wherein said step b) comprises:
   receiving auction characteristics data; accessing a database;
   retrieving from said database said bidding model, wherein said bidding model is selected based on a corresponding relevance of said auction characteristics data; and
   outputting said bidding model.

16. The computer readable medium as recited in claim 13, wherein said step c) comprises:
   receiving said bidding model;
   receiving historical bids data;
   transforming said historical bids data to a sample of inverted bids, wherein said historical bids data are transformed by inverting said bidding model;
   estimating a structure of said market, wherein said sample of inverted bids receives application of statistical density estimation techniques to obtain said structure; and
   outputting said structure.

17. The computer readable medium as recited in claim 13, wherein said step d) comprises:
   receiving a second user input; receiving a structure;
   generating a bid function, wherein said bid function is based on said structure and said second user input; and
   outputting said bid function.

18. The computer readable medium as recited in claim 17, wherein said second user input comprises: an auction format; a valuation of said item; and an expected number of rival bidders.

* * * * *